Patented Feb. 7, 1950

2,496,933

UNITED STATES PATENT OFFICE 2,496,933

LINEAR POLYESTERS OF HYDROQUINONE, SATURATED GLYCOLS AND DICARBOXYLIC ACIDS AND THEIR PREPARATION

John R. Caldwell, Kingsport, Tenn., assignor to Eastman Kodak Company, Rochester, N. Y., a corporation of New Jersey No Drawing. Application May 25, 1946, Serial No. 672,327

6 Claims. (Cl. 260—47)

This invention relates to the preparation of linear polyesters by reacting together hydroquinone, a glycol, and a dibasic acid by heating in the presence of acetic anhydride. This invention also relates to the linear polyester prepared thereby.

Linear polyesters derived from hydroquinone and dibasic acids have been referred to in the art. These polyesters have been difficult to make by heating hydroquinone with the dibasic acid even though a powerful catalyst was present. The prior art describes these linear polyesters as being infusible and insoluble in all solvents.

The prior art does refer to polyesters prepared using a glycol and a dibasic acid, but those products have been characterized by a low melting point and thus were not resistant to deformation by heat. For instance, the prior art states that polyesters derived from adipic acid and ethylene glycol melt at 50° C., and the ester of trimethylene glycol and adipic acid melts at 45° C. In contrast to this, the polyesters of adipic acid, such as prepared in accordance with my invention, are characterized by melting points of 200° C. or higher.

One object of my invention is to provide a method of preparing linear polyesters having a somewhat higher melting point than those which have previously been prepared. Another object of my invention is to provide a method for preparing linear polyesters containing the hydroquinone radicle

in the main valence chain. A further object of my invention is to provide linear polyesters which have a high melting point, but, nevertheless, which are fusible and are soluble in organic solvents. A still further object of my invention is to provide a method of preparing linear polyesters containing hydroquinone radicles in combination with saturated glycol radicles in the main valence chain. Other objects of my invention will appear herein.

I have found that linear polyesters having new and useful properties may be obtained by reacting together hydroquinone, a saturated glycol, and a dibasic acid. I have found that hydroquinone, a saturated glycol, and a dibasic acid may be reacted together by heating in the presence of acetic anhydride whereby the acetic acid formed during the course of the reaction is distilled off therefrom. Heretofore, in polymerization processes, it has been supposed that the presence of a mono-functional derivative, such as acetic acid, would stop chain growth and prevent polymer formation. References are contained in the literature to the use of acetic acid for stabilizing or terminating chain growth in linear polymer condensation. I have found, however, that heating in the presence of acetic anhydride with the formation of acetic acid actually promotes the formation of linear polyesters from hydroquinone, saturated glycols and dibasic acids in accordance with my invention.

The dibasic acids which are suitable for use in my invention may, for example, be succinic acid, glutaric acid, adipic acid, pimelic acid, suberic acid, azelaic acid, sebacic acid, dimerized oleic acid, or for that matter any of the organic acids characterized by the presence of two carboxyl groups. The glycols which may be employed in the invention include ethylene glycol, diethylene glycol, triethylene glycol, 1,3-propylene glycol, 1,4-butylene glycol, 1,6-hexylene glycol, or for that matter any of the saturated aliphatic liquid glycols.

A convenient method for carrying out the preparation of linear polyesters in accordance with my invention is to mix hydroquinone, the saturated glycol, and the dibasic acid with an excess of acetic anhydride, and placing the mixture in a reaction vessel. The temperature is then raised until the acetic acid formed in the mass begins to distill. Heating is continued until a large portion of the theoretical amount of acetic acid (such as 70–80%) is distilled therefrom. It is then desirable to separate the linear polyester from the residual acetic acid and acetic anhydride. This may be accomplished, for instance, by placing the reaction vessel under a vacuum of 0.1 to 0.5 mm. of mercury and heating at 200–220° C. for 6 to 10 hours. The reaction is conveniently carried out in the usual type of distillation apparatus in which the reaction chamber is equipped with a fractionating column. In carrying out the reaction it is desirable to maintain the column at a reflux ratio whereby the acetic acid will be separated from the acetic anhydride in the vapors therefrom. Although not necessary, it may often be desirable to use catalyst, such as zinc chloride or potassium acetate in the reaction operation.

In the preparation of linear polyesters in accordance with our invention, the hydroquinone should be at least 20% of the polyhydroxy constituents employed in the reaction, and the glycol used should be at least 10% thereof. It is desirable to employ an excess of acetic anhydride in the operation. For example, the reaction is conveniently performed by using approximately 2.1 to 2.3 mols of acetic anhydride for each mole of dibasic acid. It is to be understood, however, that the proportion of acetic anhydride may vary considerably, providing the proportion of acetic anhydride is greater than that of the dibasic acid used. For instance, the amount of acetic anhydride may be as much as five mols or more thereof per mol of dibasic acid although it is preferable to stay within the range first indicated. The preferred ratio of hydroquinone to glycol to be employed in the process is 0.8–0.4 mol of hydroquinone to 0.2–0.6 mol of glycol. It is to be understood, however, that ratios outside of this range may be employed, providing the hydroquinone and the glycol are at least the lower limits stated. I have found that as a general rule the melting point of the polymer is raised by increasing the mol percent of hydroquinone which is employed.

The products of my invention are solids ranging in properties from tough, wax-like materials to hard, brittle glasses, but all of these products are fusible and are soluble in organic solvents. The melting points of these products lie within the range of 90–300° C. The products are useful as constituents of varnishes, lacquers, paints, and other types of protective coatings. As a rule, these products tend to impart hardness and gloss to the coatings resulting from compositions containing them, as well as imparting resistance to deformation by moderate heats. These products also are resistant to decomposition by ultraviolet light, particularly those in which a substantial proportion of the hydroquinone radicle is present. My invention is valuable in that linear polyesters of any desired melting point from 90–300° C. may be prepared, this factor being controlled by altering the ratio of hydroquinone to glycol. The melting point also may be varied to some extent by the use of particular glycols and dibasic acids in the condensation operation. If desired, instead of one saturated glycol or dibasic acid, more than one of either of these, or both, may be employed in the operation, thus further modifying the material which is prepared thereby.

The following examples illustrate the preparation of linear polyesters in accordance with my invention:

*Example 1.*—A mixture was prepared of 33 parts of hydroquinone, 11 parts of diethylene glycol, 60 parts of adipic acid, and 100 parts of acetic anhydride. This mixture was placed in a distillation apparatus equipped with a fractionating column. The vessel containing the mixture was heated by an oil bath, and the temperature was slowly raised until acetic acid began to distill therefrom. The heating was continued until 75–80 parts of acetic acid distilled. During this period the temperature of the oil bath was raised to about 200° C. A vacuum of approximately 1 mm. of mercury was then applied, and the flask was maintained at a temperature of 200–220° C. for 6 hours to remove residual acetic acid and acetic anhydride. The resulting product was found to be a hard, tough wax having a melting point of 185–190° C. The product was soluble in a hot mixture of benzene and dioxan and was partially soluble in hot acetic acid.

*Example 2.*—A mixture of 28 parts of hydroquinone, 17 parts of diethylene glycol, 60 parts of adipic acid, and 100 parts of acetic anhydride was placed in a distillation apparatus as described in the preceding example and heating was continued until 75–80 parts of acetic acid distilled over. The mass was heated at 200–210° C. for 8 hours in a vacuum of 0.10 mm. The resulting product which was a polyester of hydroquinone, diethylene glycol, and adipic acid was a hard, tough wax, melting at 110° C.

*Example 3.*—A mixture of 22 parts of hydroquinone, 81 parts of sebacic acid, and 100 parts of acetic anhydride was mixed together and placed in a distilling apparatus and heated until 80–85 parts of acetic acid distilled over. 12½ parts of ethylene glycol were added and the mass was heated to 180–220° C. and maintained at that temperature for 2–4 hours at atmospheric pressure. A vacuum of 1 mm. was then applied and heating was continued at 200–220° C. for 3 hours. The product obtained was a hard, tough wax having a melting point above 120° C. The product was a linear polyester of hydroquinone, ethylene glycol, and sebacic acid. It was soluble in hot dioxan and partially soluble in hot acetic acid.

I claim:

1. A method of preparing a linear polyester which comprises heating a mixture of 0.8–0.4 mol. of hydroquinone, 0.2–0.6 mol. of a saturated aliphatic glycol containing only C, H and O and having glycol hydroxyl groups as the only reactive groups therein, a dicarboxylic acid selected from the group consisting of succinic, glutaric, adipic, pimelic, suberic, azelaic, sebacic and dimerized oleic acid and acetic anhydride, the dicarboxylic acid being in an amount sufficient to esterify the hydroquinone and the glycol and the acetic anhydride being in an amount greater than that of the dicarboxylic acid, until acetic acid begins to distil from the mass and continuing the heating until 70–80% of the theoretical acetic acid distils therefrom.

2. A method of preparing a linear polyester which comprises heating a mixture of 0.8–0.4 mol. of hydroquinone, 0.2–0.6 mol. of diethylene glycol, a dicarboxylic acid selected from the group consisting of succinic, glutaric, adipic, pimelic, suberic, azelaic, sebacic and dimerized oleic acid and acetic anhydride, the dicarboxylic acid being in an amount sufficient to esterify the hydroquinone and the glycol and the acetic anhydride being in an amount greater than that of the dicarboxylic acid, until acetic acid begins to distil from the mass and continuing the heating until 70–80% of the theoretical acetic acid distils therefrom.

3. A method of preparing a linear polyester which comprises heating a mixture of 0.8–0.4 mol. of hydroquinone, 0.2–0.6 mol. of ethylene glycol, a dicarboxylic acid and acetic anhydride, the dicarboxylic acid selected from the group consisting of succinic, glutaric, adipic, pimelic, suberic, azelaic, sebacic and dimerized oleic acid being in an amount sufficient to esterify the hydroquinone and the glycol and the acetic anhydride being in an amount greater than that of the dicarboxylic acid, until acetic acid begins to distil from the mass and continuing the heating until 70–80% of the theoretical acetic acid distils therefrom.

4. A method of preparing a linear polyester which comprises heating a mixture of 0.8–0.4 mol. of hydroquinone, 0.2–0.6 mol. of a saturated aliphatic glycol containing only C, H and O and having glycol hydroxyl groups as the only reactive groups therein, adipic acid and acetic anhydride, the adipic acid being in an amount sufficient to esterify the hydroquinone and the glycol and the acetic anhydride being in an amount greater than that of the adipic acid, until acetic acid begins to distil from the mass and continuing the heating until 70–80% of the theoretical acetic acid distils therefrom.

5. A method of preparing a linear polyester which comprises heating a mixture of 0.3–0.4 mol. of hydroquinone, 0.2–0.6 mol. of a saturated aliphatic glycol containing only C, H and O and having glycol hydroxyl groups as the only reactive groups therein, sebacic acid and acetic anhydride, the sebacic acid being in an amount sufficient to esterify the hydroquinone and the glycol and the acetic anhydride being in an amount greater than that of the sebacic acid, until acetic acid begins to distil from the mass and continuing the heating until 70–80% of the theoretical acetic acid distils therefrom.

6. A method of preparing a linear polyester which comprises heating a mixture of 0.3–0.4 mol. of hydroquinone, 0.2–0.6 mol. of diethylene glycol, adipic acid, and acetic anhydride, the adipic acid being in an amount sufficient to esterify the hydroquinone and the glycol, and the acetic anhydride being in an amount of 2.1–2.3 mols. thereof for each mol. of adipic acid, until acetic acid begins to distil from the mass and continuing the heating until 70–80% of the theoretical acetic acid distils therefrom.

JOHN R. CALDWELL.

REFERENCES CITED

The following references are of record in the file of this patent:

UNITED STATES PATENTS

| Number | Name | Date |
| --- | --- | --- |
| 2,028,908 | Hoffman | Jan. 28, 1936 |
| 2,035,578 | Wagner | Mar. 31, 1936 |